United States Patent Office 3,285,151
Patented Nov. 15, 1966

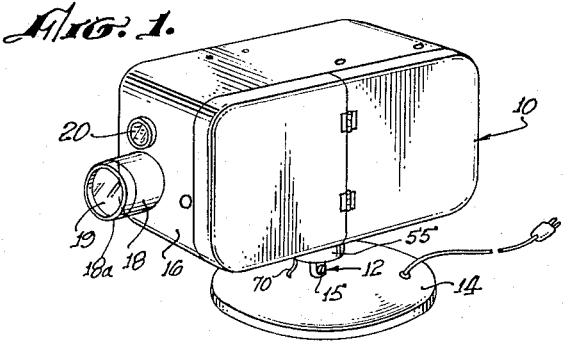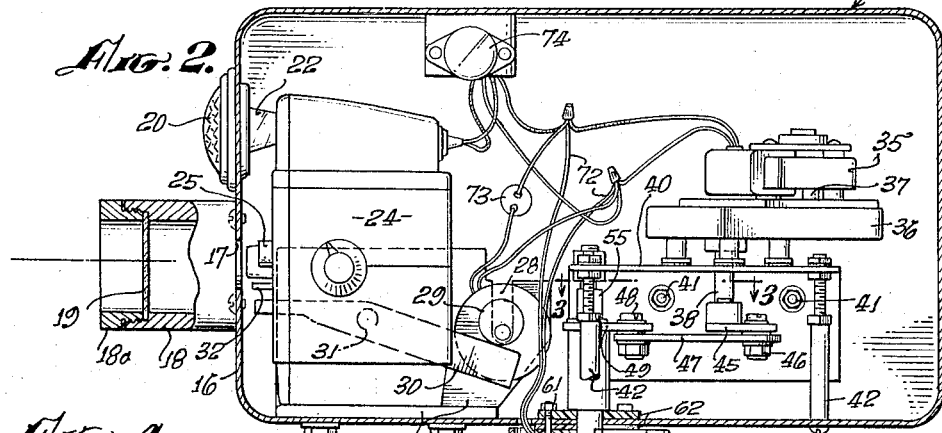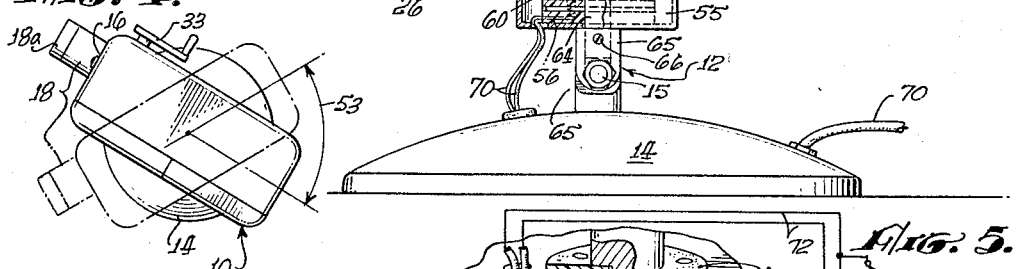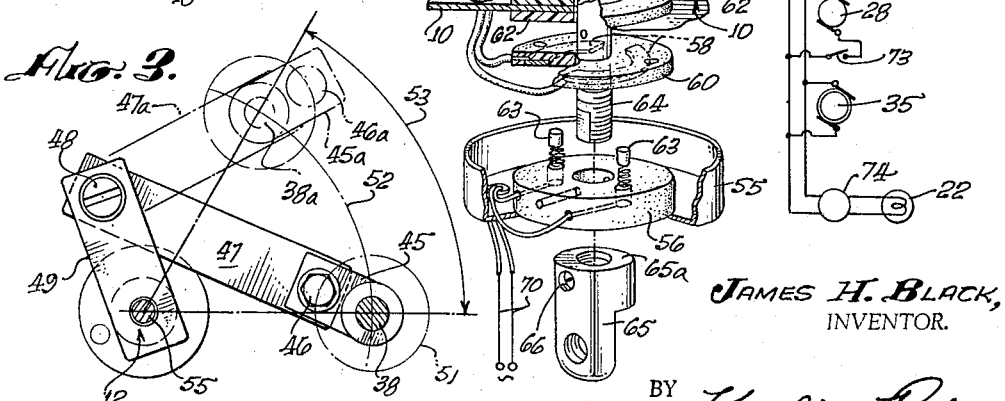

3,285,151
AREA SURVEILLANCE DEVICE
James H. Black, 140 Sheldon St., El Segundo, Calif.
Filed May 15, 1964, Ser. No. 367,733
2 Claims. (Cl. 95—15)

The present invention relates generally to monitors or surveillance devices adapted to establish a more or less continuous surveillance over a predetermined area; and more especially, the present invention relates to a device of this character which can be employed in stores and the like to provide a deterrent to shop-lifting and petty thievery.

Shop-lifting is not a new probelm to the store owner, rather it is a problem that has existed on an appreciable scale for a long period of time. However, until fairly recent years it was largely confined to department stores, clothing stores, and the like in which the merchandise was directly accessible to retail customers. However, with the rising cost of labor that has taken place within the last decade or two, a much greater variety of merchandise is now available in stores of the self-service type. The familiar supermarket or shopping center offers a wide variety of items, many of which are easily hidden in a purse or in the pocket of a suit or coat; consequently stores of this type offer a fertile field of operation for the shop-lifter.

The popularity of the self-service type of store comes, of course, from the reduction of labor in handling the articles at the retail level and consequently the opportunity afforded the store owner to sell his merchandise at a minimum price. The elimniation of clerks who deal with each individual customer and the need for direct access by the customers to the goods offered for sale combine to make it easier for the customer to indulge in shop-lifting or petty thievery. The customer is free to go through the store at will. In many cases he is unobserved by any employees of the store because he is more or less hidden behind the high stacks of goods along the sides of aisles; and often the customer is unobserved by other customers, especially at slack shopping times, although a heavy rush of customers may likewise provide a screen for shop-lifting activities because everyone is in a hurry and relatively unobservant. These conditions make it relatively simple for a customer who is so inclined to take small items that can be concealed in a pocket, a purse, or similar places of concealment.

Although people generally are basically honest, there are still many who yield to temptation rather easily when opportunity affords. Children as well as persons under the economic pressures of modern living sometimes find temptation too much to resist. This fact is attested to by the surprisingly large total of the annual losses incurred in self-service stores through pilferage and petty theft. While these articles are doubtlessly taken by a relatively small percentage of the total customers yet, in the aggregate, the total dollar value of such losses is surprisingly large. Such a loss becomes a severe economic problem in highly competitive stores because of the small margin of profit upon which such stores are normally operating. Losses of this type are due both to habitual offenders and to people who suddenly yield to an impulse to take articles which they desire when they suddenly realize that they can pick them up and hide them without being seen by the clerks or other customers.

Theft on impulse can be largely prevented by rather simple deterrents. Actual observation of the shopper is, of course, the most effective deterrent since no one wishes to risk detection. On the other hand, the capability of observation of a shopper when coupled with the obvious suggestion of that capability of observation, has also been found to be a very effective deterrent. This is true even though the capability of observation is rather limited or is exercised only to a limited extent, or is apparent rather than real. Experience has indicated that the obvious ability to exert some degree of observation over an area within a store acts as a very strong deterrent to shop-lifting, even though it may fail in some cases, as some persons may fail to see the surveillance device.

Accordingly it is a general object of the present invention to provide a monitor or surveillance device which is adapted to keep under observation a particular portion of a store or a market and to at least suggest to the observer perhaps a higher degree of continuous observation than is actually exerted in order to deter shop-lifting and pilfering.

It is another object of the present invention to provide a device of this character which is economical to build and install. Cost is an important factor in the commercial desirability of a device of this kind since the device is nonproductive in the sense that it does not add to the profit of the store by any of its own actions. It serves as insurance or as a preventive measure so that the cost of an adequate installation and its maintenance must be less, and preferably substantially less, than the losses which it is designed to prevent in order that it may readily appeal to the store owner as an attractive investment.

A further object of the invention is to provide a monitor or area surveillance device which provides the capability of limited actual observation of the area concerned, as by making periodic photographic exposures, preferably of portions of the total area covered, combined with the appearance of continuous observation to such a degree that the potential shop-lifter is convinced that he is under observation and would be caught if he improperly appropriated any of the merchandise.

The objects of the invention are accomplished in an area surveillance device which, in its broad aspects, comprises a housing bearing an obvious resemblance to a camera and having a front wall, a cylindrical projection on the front wall with a lens-like glass window at the front end of the projection to resemble the lens tube of a camera, support means pivotally supporting the housing for oscillating movement through a generally horizontal arc, and means within the housing for imparting such oscillating movement to the housing. The housing may typically be more or less rectangular in plan and in elevation and of a size to give the general appearance of a motion picture camera or a closed-circuit television camera; and it may preferably be provided with a flashing signal light mounted on said front wall at a position where it is easily visible to an observer. It may be satisfactory to use the device in this form since the movement of the housing through a horizontal arc draws attention to it as it scans an area; and the oscillating movement combined with the intermittently flashing signal light creates sufficient uncertainty in the mind of a customer about the nature of the observation to be a deterrent to shop-lifting.

In a preferred and slightly more complex embodiment, the surveillance device includes a multiple exposure type of camera inside the housing with its lens at said opening in the front wall in order to take pictures through the lens. Means are provided to actuate the camera periodically. For this purpose a motion picture camera may be easily adapted to take single exposures. Typically, the interval between successive exposures of the camera is not equal to the time cycle of the oscillation of the camera with the result that pictures are taken by the camera at different positions throughout the range of oscillation. However, the camera actuating mechanism can be operated either in timed relation to the oscillation or by the oscillating mechanism in such a fashion that exposures are always taken at the same point during oscillating travel of the camera.

How the above objects of the invention, as well as others not specifically referred to herein, are attained will be better understood by reference to the following description and to the annexed drawing, in which:

FIG. 1 is a perspective showing in elevation a surveillance monitor constructed according to the present invention.

FIG. 2 is an enlarged elevation with the side wall of the housing broken away to show the camera and the drive mechanism located within the housing.

FIG. 3 is a diagram of the linkage for oscillating the housing.

FIG. 4 is a schematic plan view illustrating the movement of the housing through a horizontal arc.

FIG. 5 is a combined electric circuit diagram and fragmentary perspective of the bearing supporting the housing.

Referring now to the drawing, there will be seen in FIG. 1 a perspective of a surveillance device embodying the present invention. The device comprises a housing, indicated generally at 10 which is supported by post 12 on base 14. Post 12 may be a rigid member; but it preferably is made in two sections, as shown in FIG. 2 particularly, which are joined by a horizontally extending bolt 15 which provides a horizontal axis about which the housing can swing in a vertical arc. This arrangement has value particularly when the monitor is located at a position several feet above the floor of a store and it can then be pointed downwardly by tilting the housing slightly around the axis of bolt 15, which is then tightened to hold the two sections of the post at the desired angle of tilt.

It will be noticed from FIGS. 1 and 2 that housing 10 is a box-like enclosure provided with a plurality of generally upright side walls of which one wall 16 may be regarded as the front wall. Although the housing is here shown as being generally rectangular in outline when viewed either in elevation or in plan, it is to be understood that this is not limitative upon the present invention since any suitable shape may be used.

The housing wall 16 is provided with an opening 17 in front of which is mounted a generally tubular member 18. Tubular member 18 may be cylindrical or it may be tapered and is designed to resemble the lens tube of a camera. This resemblance is increased by providing near the front end of tube 18 a glass window 19 which gives the general appearance of a photographic lens within the tube. To hold the window in place, a portion of the tube 18a is removably connected to the rest of the tube, as by a threaded joint, and holds the glass window in place.

At another opening in the front wall 16 is located a molded glass lens 20, which is preferably colored red or amber. This lens is faceted to increase the brilliance of the small electric light 22 located immediately behind the lens, as will be further described. The lens 20 may be located at any other position on the housing if desired, but its location on the front wall of the housing is favored because of its close association with lens tube 18.

Located inside housing 10 is camera 24, which may be of any suitable size and type. Although various types of cameras are suitable, it is contemplated that this camera will be motion picture camera using 8 mm. or 16 mm. film and one in which the usual film movement has been modified, as is well known in the art, to produce a single exposure of the film each time the shutter release mechanism is actuated. It will be noted that the camera lens 25 is located directly behind aperture 17 in the housing wall so that the camera takes a picture through opening 17 and window 19.

Motion picture camera 24 is mounted within the housing on a mounting bracket indicated generally at 26. Mounting bracket 26 is of angular configuration and has an upstanding plate along the backside of the camera as viewed in FIG. 2. On this plate is mounted low speed motor 28 which drives a rotating cam 29. The cam engages camera operating lever 30 which is pivoted at a suitable point 31 between its ends on the upstanding plate of the mounting bracket. This pivot 31 allows the actuating lever to swing in a vertical plane so that upward movement of the forward end of the lever causes the lever to engage and raise operating arm 32 which releases the camera shutter and exposes the film in the camera.

Camera 24 is spring driven; and the spring may be wound up as required by using the winding crank 33 on a shaft projecting through the housing wall, as in FIG. 4. If the camera is battery operated, crank 33 is not needed and is omitted Cam 29 is an eccentrically mounted circular disc, so cam 29 has a single lobe. With this arrangement it will be seen that one exposure on the film is taken for every complete revolution of cam 29. For this reason the motor is a very low speed motor, typically one which revolves cam 29 at the rate of one revolution per minute. A higher exposure rate may be obtained by increasing the number of lobes on cam 29. Of course, the other speeds may be chosen for the motor or gears may be introduced into the drive train to change the frequency with which the rotating cam operates the camera, as may be desired under any circumstances.

Drive means for imparting an oscillating movement to housing 10 and to the camera therein are shown in FIGS. 2 and 3. Such drive means include an electric motor 35 mounted on and above gear box 36, the motor being connected to the input shaft 37 of the gear box. The box contains a train of speed reducing gears (not shown) which may be of any design and speed reduction ratio in order to produce the desired rotational speed of shaft 38 which is the output shaft of the gear box.

Gear box 36 is mounted upon the outwardly projecting leg of angle bracket 40 which serves as a means for mounting the motor and gear box on the housing. The downwardly projecting leg of the bracket is attached to one side wall of the housing by means of one or more bolts 41. Additional stability is provided for the bracket by one or more adjustable support posts 42 which extend between the outwardly projecting leg of the bracket and the bottom wall of the housing, as may be seen in FIG. 2.

The drive means also includes the linkage shown in elevation in FIG. 2 and schematically in greater detail in FIG. 3. The lower end of drive shaft 38, which is the output shaft of the gear box, is non-rotatably attached to one end of crank 45. At a position spaced therefrom and near the other end of crank 45, the crank is pivotally connected by bolt 46 to intermediate link 47 near one end of the latter. At its other end, intermediate link 47 is pivotally connected by bolt 48 to stationary arm 49, which is suitably connected in a non-rotatable manner to the upper end of support post 12. Arm 49 and post 12 remain stationary while the housing oscillates with respect to these members about the more or less vertical axis established by the upper section of post 12.

The operation of the connected linkage will now be explained with particular reference to FIG. 3. As output shaft 38 rotates, it rotates crank 45 about the axis of the drive shaft and causes pivot 46 to move in a circular path, indicated by the broken line 51, around the drive shaft. The end of link 47 connected by pivot 46 to crank 45 describes a similar path, while the other end of the link, being connected at 48 to fixed arm 49, swings between the position indicated in full lines in FIG. 3 and the dot-dash position 47a. The rotation of drive shaft 38 causes a change in the combined length of the elements 45 and 47, ranging from the maximum shown in full lines in FIG. 3 when the axes of pivots 48 and 46 and shaft 38 are in a straight line, to a minimum distance shown in dot-dash lines in FIG. 3 when these three axes are again on a straight line but the shaft at 38a is now between pivots 46a and 48. The center of drive shaft 38 moves over an arcuate path 52 with the axis of post 12 as the center.

The total angle of movement of housing 10 about the axis of post 12 is indicated at 53 in FIGS. 3 and 4 and for the relative sizes of the parts illustrated amounts to approximately 60 degrees. A larger or smaller angle can be obtained by changing the length of either crank 45 or link 47. The housing moves in an arc that may be described as generally horizontal as it always has a substantial horizontal component of motion even if it lies more accurately in a tilted plane.

Although the weight of housing 10 and its contents normally may be taken entirely on the support bearing structure hereinafter described on post 12, additional lateral stability and attendant steadiness of movement of the housing may be achieved by providing pivotal connection 55 between the upper end of post 12 and the outstanding leg of angle bracket 40. The connection between the housing and the post at this point resists lateral movement of the housing relative to the post and relieves the support bearings of undesirable loads.

Surrounding post 12 underneath housing 10 is a cup-like bearing retainer 55, which directly supports and has attached to it a lower thrust bearing 56. Above and resting on the lower thrust bearing 56 is the upper thrust bearing 60 which is firmly connected to housing 10 by screws 61. These screws may also be used to hold in place one or more rings 62 which surround and form a journal bearing against the outer surface of post 12. Embedded in the under surface of thrust bearing 60 are two spaced arcuate contacts 58, shown diagrammatically in FIG. 5. At the upper surface of lower bearing 56 are two spaced electrical contacts 63 of the brush type, one contact 63 sliding on each of the two arcuate contacts 58. Contacts 63 are spring-urged upwardly.

The thrust bearing assembly just described may be held assembled in any suitable manner but this is conveniently accomplished by making the upper section of post 12 in two portions, one portion 64 having a threaded shank received in socket 65. The upper portion 64 is then held against turning in the socket by set screw 66; and the upper end of the socket provides an upwardly facing shoulder 65a engaging the under face of bearing retainer 55.

The electrical circuit is shown in FIG. 5. A pair of conductors 70 are connected to any suitable source of power, normally the familiar 110 volt alternating current domestic supply. These conductors enter base 14 and then emerge therefrom at a position close to retainer 55, there being enough slack in them to permit tilting of the housing about axis 15 without any strain on the conductors. These conductors are connected to brushes 63.

Brushes 63 are in sliding contact with arcuate contacts 58 that are connected to a pair of conductors 72 which conduct electric power to camera motor 28, drive motor 35 for the oscillating action, and lamp 22, all three of these elements being connected in parallel to conductors 72 as shown in circuit diagram in FIG. 5. The camera motor is optionally wired in series with a manual switch 73 enabling the camera motor to be turned off at will while still energizing motor 35 and lamp 22 to give the appearance of full operation. Since it is not desired that lamp 22 be lighted continuously, it is wired in series with a flasher unit 74, which may be of any suitable type, designed to energize the light at short intervals. The frequency of the light flashes is preferably greater than the rate of oscillation of the camera. For example, if the camera makes a complete oscillation from one side to the other and back again in about 10 seconds, the frequency of the light flashes is preferably of the order of 1 each 3 or 4 seconds in order to show up several times during each scanning cycle of the camera housing.

Locating signal light 22 and lens 20 near lens tube 18 associates these two in the mind of an observer and as a consequence an observer may conclude that a picture is taken each time the light flashes. It is true that the film may be exposed in synchronism with the light flashes; but it is preferred to take a picture only at longer intervals. It was assumed above that cam 29 rotates once each minute; and this is a satisfactory frequency for the exposures, as it serves the purpose intended while being economical of the picture film. A higher frequency may be employed, in especially sensitive areas, or a lower frequency, if adequate.

By actuating the camera at a cyclic rate equal to the housing oscillation cycle, or a multiple thereof, each picture is taken at substantially the same position in the oscillation cycle and, therefore, covers substantially the same area of the store. If the two cyclic rates are unequal and the film exposure cycle is the longer but not a multiple of the shorter oscillation cycle, then the pictures are taken progressively or at random over the area scanned by the monitor. This condition is preferred as usually giving best picture coverage and protection at minimum film consumption.

The brush-type sliding contacts incorporated into the supporting bearing are especially advantageous as they eliminate all bending, flexing, or pulling on the electrical conductors between the base and housing. Experience indicates that conductors deteriorate appreciably when continually flexed; and this arrangement contributes to a long, trouble-free life of the monitor by eliminating stress and strain on the conductors leading to the oscillating housing.

It is apparent that various changes in the surveillance device may occur to persons skilled in the art without departing from the spirit and scope of the present invention. As one example, it will be evident without detailed disclosure that lever 30 could be replaced by a solenoid operating camera lever 32, in which case cam 29 would periodically close contacts in the circuit energizing the solenoid. This arrangement is especially advantageous with a known type of camera that operates either one frame at a time or full motion picture accordingly as lever 32 is moved one way or the other from a neutral non-operating position. A double acting solenoid is, of course, used in this case. Accordingly, it is to be understood that the foregoing description is considered to be illustrative of, rather than limitative upon, the invention as defined by the appended claims.

I claim:

1. A surveillance device comprising in combination:
a camera having a shutter;
support means pivotally mounting the camera for movement over an arc;
drive means oscillating the camera back and forth over said arc;
and means other than said drive means to actuate the camera shutter intermittently, said last-mentioned means being separate from and actuating the shutter independently of the oscillating movement of the camera, and a signal light and circuit means energizing the signal light intermittently at a frequency unrelated to the frequency of camera oscillation or camera shutter operation.

2. A surveillance device comprising in combination:
a camera having a shutter;
support means pivotally mounting the camera for movement over an arc;
drive means oscillating the camera back and forth over said arc;
means other than said drive means to actuate the camera shutter intermittently, said last-mentioned means being separate from and actuating the shutter independently of the oscillating movement of the camera wherein the camera actuating means comprises
a second electric motor having a unidirectionally rotating output shaft;

cam means rotated by the output shaft of the second motor;

and mechanical linkage operated by said cam means to actuate the camera shutter at a frequency independent of the frequency of oscillatory movement of the camera.

References Cited by the Examiner

UNITED STATES PATENTS 2,250,442  7/1941  Abell _____ 352—39
3,120,160  2/1964  Hammer _____ 95—15

JOHN M. HORAN, *Primary Examiner.*